United States Patent [19]

Hendrickson

[11] 4,369,826
[45] Jan. 25, 1983

[54] MULTI-PIECE WHEEL STRUCTURE

[75] Inventor: Vergil P. Hendrickson, Decatur, Ill.

[73] Assignee: Caterpillar Tractor Co., Peoria, Ill.

[21] Appl. No.: 275,083

[22] PCT Filed: Jan. 23, 1981

[86] PCT No.: PCT/US81/00091
§ 371 Date: Jan. 23, 1981
§ 102(e) Date: Jan. 23, 1981

[87] PCT Pub. No.: WO82/02518
PCT Pub. Date: Aug. 5, 1982

[51] Int. Cl.³ .................... B60B 25/08; B60B 25/18
[52] U.S. Cl. .................................. 152/410; 152/427; 152/DIG. 10
[58] Field of Search ................... 152/405–410, 152/427, 428, DIG. 9–DIG. 11; 301/5 VH, 355 L

[56] References Cited

U.S. PATENT DOCUMENTS

| | | | |
|---|---|---|---|
| 2,822,021 | 2/1958 | Shipman et al. | 152/410 |
| 2,894,556 | 7/1959 | Darrow | 152/410 |
| 3,882,919 | 5/1975 | Sons et al. | 152/410 |
| 3,995,676 | 12/1976 | Casey | 152/410 |
| 4,021,077 | 5/1977 | Pringle | 301/13 |
| 4,043,375 | 8/1977 | Casey | 152/410 |
| 4,049,320 | 9/1977 | DeRegnaucourt et al. | 301/13 |
| 4,116,489 | 9/1978 | Walther | 301/12 |

OTHER PUBLICATIONS

Goodyear Off-Highway Rim Cat. EM75-6086.

*Primary Examiner*—Charles A. Marmor
*Attorney, Agent, or Firm*—Joseph W. Keen

[57] ABSTRACT

A multi-piece wheel structure (16) permits inflation of a tire (10) mounted thereon only when components constituting the wheel structure (16) are locked together. The wheel structure (16) includes an annular rim base (18) having an indentation (36), a restraining flange (22) arranged about the rim base (18) prevent axial movement of the tire (10) mounted on the rim base (18), a locking ring (24) insertable in the indentation (36) between the restraining flange (22) and the rim base (18) on one axial side of the restraining flange (22), a conduit structure (44,46) which extends through the rim base (18), a groove (53) in the rim base (18) intersecting the indentation (36), at least one biasing hole (52) in the rim base (18) connecting the conduit structure (44,46) and the groove (53), and a sealing ring (26) located in the groove (53) in sealing engagement with the rim base (18) only when the locking ring (24) is completely disposed in the indentation (36) in engagement with the locking ring (24).

5 Claims, 2 Drawing Figures

MULTI-PIECE WHEEL STRUCTURE

DESCRIPTION

1. Technical Field

This invention relates generally to multi-piece wheel structures and, more particularly, to means for preventing inflation of a tire mounted thereon when the wheel structure is improperly assembled.

2. Background Art

Large wheels used on vehicles such as earthmoving apparatus are typically of multi-piece construction which permit tires to be mounted thereon and locked into sealing engagement therewith without deforming the tires' inner edges or beads over protruding rims which are commonly found in automobile applications. The beads of tubeless tires mounted on such multi-piece wheel structures are axially restrained on one side by a restraining flange which is typically integral with a rim base which is radially adjacent one bead and on a second side by a second restraining flange which is normally held in place by a bead seat band which is mounted radially between the rim base and the remaining tire bead. The bead seat band and the second flange are locked to the rim base by various means with means being provided for sealing between the bead seat band and the rim base so as to permit tire inflation. A representative structure having such features is illustrated in a U.S. Pat. No. 3,995,676 which is assigned to the assignee of the present invention and was issued Dec. 7, 1976.

Other wheel structures exist in which the second restraining flange is integral with the bead seat band. Such structures also include a device for locking the flange and bead seat band into a desired configuration with the rim base as well as a seal which prevents air leakage between the bead seat band and rim base. Judicious disposition of the seal such that it is engaged by the locking device only when the locking device is properly assembled provides an indication of an improperly assembled locking device by preventing inflation of a tire mounted on such rim base. Such initial refusal to inflate is preferable to tire inflation at the time of mounting and tire deflation at a time subsequent thereto since suitable inflation equipment and/or wheel structure assemblying apparatus may not be as readily available when the utilizing vehicle is operating under service conditions as when the tire is initially mounted.

Other examples of wheel structures which prevent tire inflation when improperly assembled include U.S. Pat. No. 2,822,021 and 2,894,556 which respectively issued Feb. 4, 1958 and July 14, 1959. The aforementioned wheel structures include at least three components (restraining flange, bead seat band, and locking ring) in addition to the seal. Assembly of such multiple components with a tire mounted on a rim base necessitates simultaneous manipulation of those components into a desired, cooperative configuration in which the components are interlocked. The difficulty in manipulating the multiple components into such desired configuration increases rapidly with the number of components to-be-assembled.

An example of a rim base structure assembled with one component is illustrated in a Goodyear Off-Highway Rim catalog whose number is EM75-6086. The rim type LW-LWD is illustrative of such structure and includes an integral restraining flange, locking ring, and bead seat band. For heavy construction vehicles a substantial upsetting moment tending to rotate the restraining flange about its locations of engagement with the rim base or bead seat band can result from excessive air pressure in and impact loading of such tire. Axial extension of the restraining flange under the mounted tire's adjacent bead provides a degree of resistance to such upsetting moment exerted by the mounted tire. However, under some conditions, additional axial support for the restraining flange is desirable.

Additional axial support of the restraining flange at a radial location beyond the mounted tire's inner edge is illustrated in U.S. Pat. No. 4,021,077 which issued May 3, 1977, U.S. Pat. No. 4,116,489 which issued Sept. 26, 1978, and U.S. Pat. No. 4,049,320 which issued Sept. 20, 1977. None of the aforementioned wheel structures illustrate any sealing means to prevent air leakage from a mounted tire's interior along the rim base since the tire's bead acts as its own seal against the rim base and cooperating lock ring. Moreover, such structures do not have provisions for preventing tire inflation when the locking ring is improperly assembled. In addition to the previously mentioned, copending patent application, U.S. Pat. No. 3,882,919 which issued May 13, 1975, illustrates a wheel structure which prevents tire inflation unless a locking device secures the restraining flange and bead seat band in proper configuration. While the performance of such wheel structure is admirable, the several components used therein are not inexpensive and can be difficult to simultaneously manipulate during tire mounting and removal.

The present invention is directed toward providing a minimum number of wheel components which can be manipulated into a desired configuration during tire installation, providing a structure to those components which yield high resistivity to upsetting moments exerted by the tire on the restraining flange, and supply means which cooperate with such components to prevent tire inflation when those components are improperly assembled.

DISCLOSURE OF THE INVENTION

In one aspect of the present invention a wheel structure is provided which is highly resistive to upsetting moments and which permits inflation of a tire mounted thereon only when components thereof are assembled in a locked configuration. In addition to an annular rim base on which a tire is mountable, the wheel structure includes an annular restraining flange which is disposed about the rim base in axial engagement with the tire, a locking ring which is receivable in an indentation in the rim base's outer periphery and is engageable with the restraining flange on the opposite axial side thereof as the tire, means for inflating a tire mounted on the rim base, a circular sealing ring arranged in a groove in the rim base which intersects the indentation, and means for fluidly connecting the inflation means and the groove to permit escape of inflation air at the locking ring's indentation only when the locking ring is not properly seated in the indentation.

BRIEF DESCRIPTION OF THE DRAWINGS

The invention will be more fully understood from the following detailed description of the preferred embodiment, taken in connection with the accompanying drawings, in which.

BEST MODE FOR CARRYING OUT THE INVENTION

Figure 1:
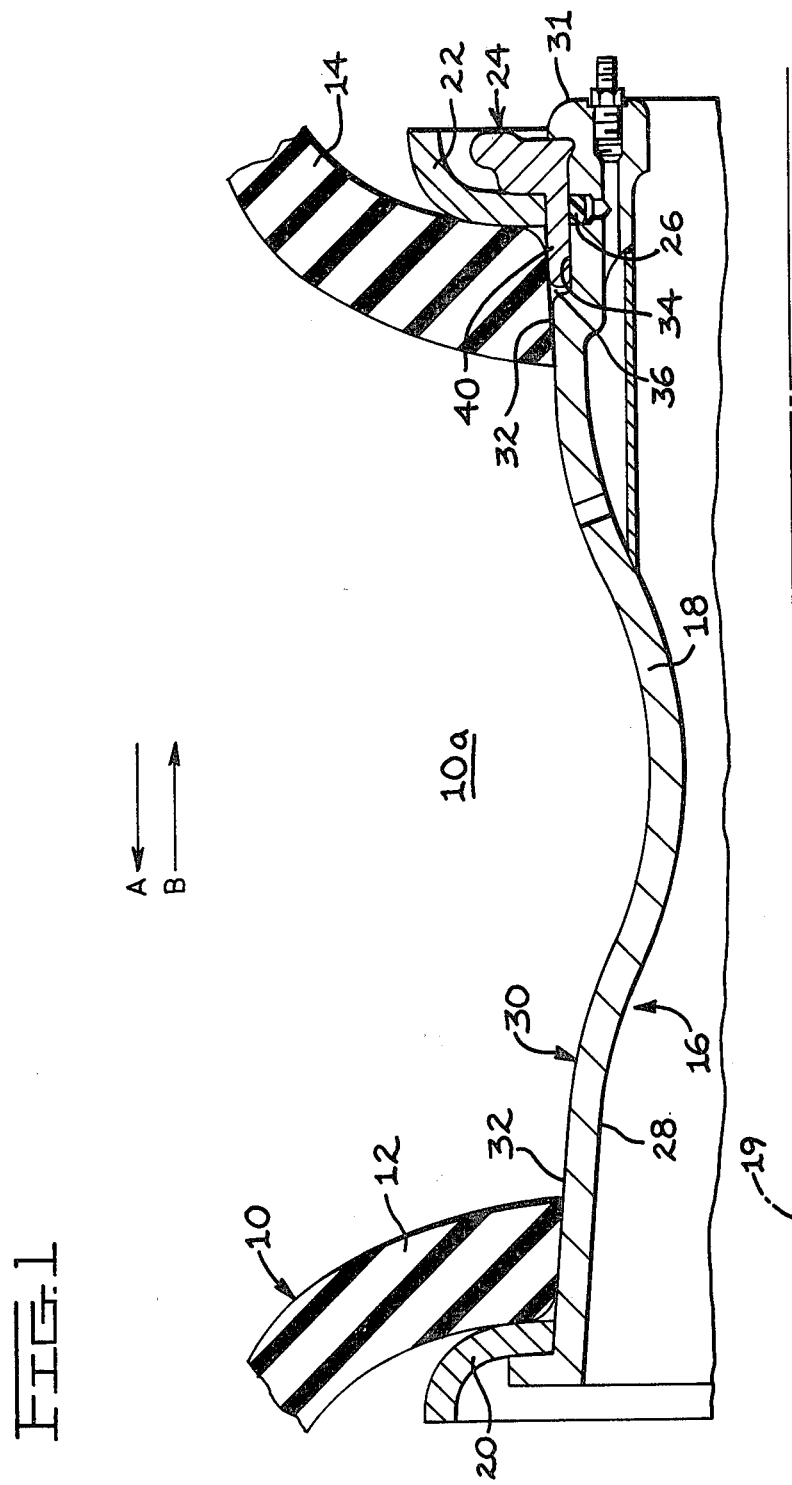
FIG. 1 is a radial sectional view through a tire and the present invention wheel structure on which the tire is mounted.

Referring now to the drawings in detail a tire 10 (only a portion of which is shown) having an interior 10a includes beads 12 and 14 which are mounted on and axially restrained by the present invention wheel structure 16. An annular rim base 18 arranged about an axis of rotation 19, a first and a second bead restraining flange 20 and 22 respectively, an annular split locking ring 24, and an air sealing ring 26 together constitute the wheel structure 16. The rim base 18 includes an inner periphery 28, an outer periphery 30, and an axial periphery 31. The outer periphery 30 has a tire mounting surface 32 and a locking surface 34 which bounds a locking indentation 36 which is radially nearer the axis of rotation 19 than the mounting surface 32. The annular locking ring 24 includes a stabilizing portion 40 and a securing portion 42. The stabilizing portion 40 is disposable within the locking indentation 36 radially inside the tire bead 14 and is engageable with the tire bead 14 and the restraining flange 22 while the securing portion 42 extends generally radially outwardly beyond the outline of the tire mounting surface 32 in axially abutting relationship with the restraining flange 22. The stabilizing portion 40 has an outer periphery securing surface 40a and an inner periphery stopping surface 40b. The outer periphery 40a is in general alignment with the tire mounting surface 32 such that an axial projection of the mounting surface 32 becomes coincident with the outer periphery 40a. The stopping surface 40b is engageable with the locking surface 34 when the locking ring 24 is disposed in its operational, locked position as illustrated in FIGS. 1 and 2.

Means for providing fluid communication from the atmosphere to the tire's interior 10a constitutes an inflation opening 44 extending through the rim base 18 from its inner periphery 28 to its outer periphery 30 and a conduit structure 46 extending axially from the inflation opening 44. A partition 48 is welded or otherwise affixed to the inner periphery 28 of the rim base 18 to form an air plenum 49 which constitutes a portion of the conduit 46. An axial air opening 50 which also constitutes a portion of the conduit 46 extends through the rim base 18 from the inner periphery 28 to the axial periphery 31 thereof so as to provide fluid communication between the air plenum 49 and the atmosphere. A valve stem 51 having an inflation port 51a which constitutes a portion of the conduit structure 46 is typically installed in the air opening 50 to regulate air transmission therethrough such as during inflation of the tire 10. The valve stem 51 may be replaced, subsequent to tire inflation, by a suitable, air tight plug threaded or otherwise securely disposed in the air opening 50. At least one biasing hole 52 having a cross sectional area A1 extends from the air opening 50 to an annular groove 53 which intersects the locking surface 34. A portion (the inflation port 51a in the illustrated embodiment) of the conduit structure 46 which is located fluidly between the biasing hole 52 and the atmosphere has a cross sectional area A2 which is preferably less than or equal to A1. While the illustrated embodiment's smaller cross sectional flow area is located in the inflation port 51a of the conduit structure 46, it is to be understood that a portion of the air opening 50 through which air is transmissible could have the aforementioned smaller air flow area A2 rather than the inflation port 51a.

The groove 53 interfaces with the locking indentation 36 and the hole 52 and has a radial depth of T1. The air sealing ring 26 is operationally resident in the groove 53 in sealing contact with the rim base 18 which axially bounds such groove, preferably constitutes a soft elastomeric material, and has a radial thickness of T2 which is preferably less than T1.

Figure 2:
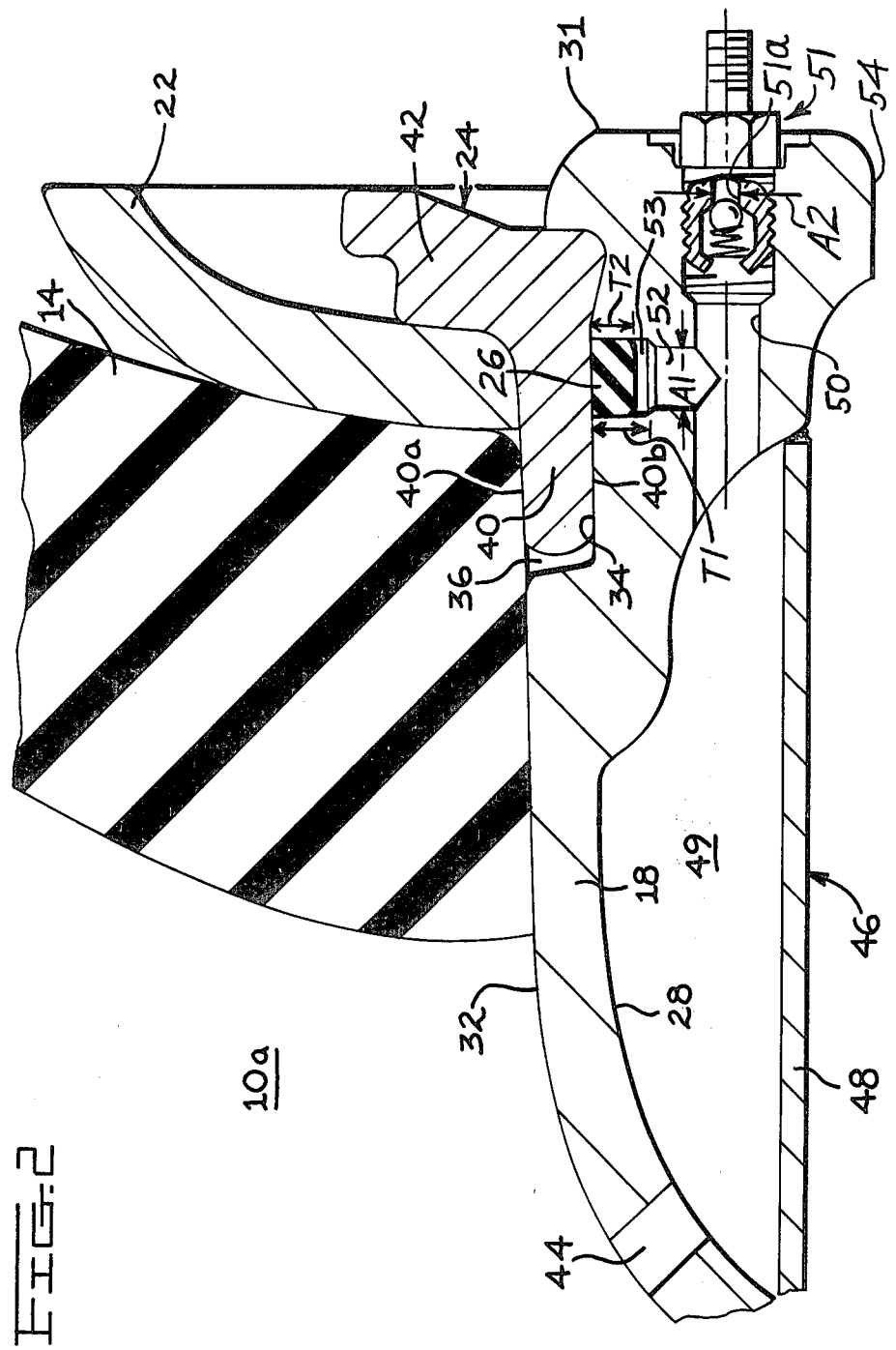
FIG. 2 is an enlarged fragmentary view showing the right side only of the wheel structure of FIG. 1.

A single hole 52, as illustrated in FIG. 2, provides the requisite degree of fluid communication to the groove 53 from the air opening 50. In the illustrated embodiment the air plenum 49, air opening 50, and inflation port 51a cooperate to form the conduit 46 since the illustrated wheel structure 16 finds application in a vehicle which transmits the driving force to the wheel through a flange structure (not shown) disposed radially with a locating surface 54 formed on the inner periphery 28 of the rim base structure 18. It is to be understood, however, that the conduit 46 could be replaced by an air inlet stem (not shown) which is fluidly connected to the hole 52 or the groove 53. Use of a final drive mechanism configured differently than that heretofore described enables use of such air inlet stems.

Industrial Applicability

Prior to mounting the tire 10 on the wheel structure 16, the tire bead restraining flange 22 and the split locking ring 24 are removed from the rim base 18. The tire 10 is then axially displaced in a direction A as indicated in FIG. 1 relative to the rim base 18 until the bead 12 engages the bead restraining flange 20 and the mounting surface 32. The tire bead 14 is then further displaced by an external deformation force in the axial direction A until it is disposed to the left of the indentation 36. The bead restraining flange 22 and the locking ring 24 are cooperatively arranged in the configuration illustrated in FIGS. 1 and 2 in which the stabilizing portion 40 of the split locking ring 24 is disposed in the indentation 36 such that the sealing surface 40b is engaged with the locking surface 34 and sealing ring 26. Subsequent to properly disposing the locking ring 24 in the indentation 36, the tire bead 14 is permitted to move to the right in a direction generally indicated by B. Rightward movement B of the tire bead 14 occurs when the external deformation form is removed and the bead 14 returns toward an unstressed, undeformed configuration. When the tire bead 14 reaches the configuration illustrated in FIGS. 1 and 2, further movement thereof in the direction B is obstructed by the restraining flange 22 which, in turn, is secured in the illustrated position by the securing portion 42 of the split locking ring 24.

In the illustrated locked wheel structure configuration the tire bead 14 is engaged with the restraining flange 22, the rim base 18 along the mounting surface 32, and the locking ring's securing surface 40a. To inflate the tire 10 to a desired pressure a source of compressed air or other fluid is serially transmitted through the inflation port 51a, the air opening 50, the air plenum 49, and the inflation opening 44 to the tire interior 10a. Additionally, air transmitted through the inflation port 51a and air opening 50 passes into the biasing hole 52 where it contacts the air sealing ring 26 and tends to drive it radially outwardly in the groove 53 beyond the locking surface 34. While the radial depth T1 of the groove 53 is preferably greater than the sealing ring's radial thickness T2 for the sake of providing a distribution channel along the groove's radially inner boundary to ensure arcuate distribution of air in the groove 53, it is to be understood that the sealing ring's radial thickness T2 could be greater than the groove depth T1 if radial deformation of the sealing ring 26 by inflation air was accounted for and utilized to provide the necessary air distribution channel. If the locking ring 24 is properly disposed in its locked configuration where its stopping surface 40b is in engagement with the locking surface 34 and sealing ring 26, such radially outward movement of the air sealing ring 26 is precluded and the tire 10 is allowed to inflate.

If, however, the locking ring 24 is not properly disposed in its locked configuration where its stopping surface 40b is engaged by the locking surface 34, the air sealing ring 26 will extrude into a part of the locking indentation 36 which the locking ring 24 does not, in the case of improper locking ring disposition, occupy. In such case air supplied through the inflation port 51a and air opening 50 passes through the biasing hole 52, through the groove 53, through the indentation 36 at the arcuate location where the locking ring's stopping surface 40b is disengaged from the locking surface 34 and sealing ring 26, and back to the atmosphere so as to prevent the inflation of the tire 10. The relative cross sectional area sizing of the biasing hole 52 (A1) and the inflation port 51a or the air opening 50 (A2) as hereinbefore described precludes air pressure increases in the tire 10 during improper disposition of the locking ring 24 by providing an air flow path to the indentation 36 which is at least as great as the air openings's inflation air path. The groove 53 interfaces with the locking indentation 36 along a continuous circular area and thus causes the tire 10 to be non-inflatable when any portion of the locking ring 24 is improperly disposed independent of the locking ring's flexibility. Moreover the groove 53 enables a uniform air pressure force to be exerted on the sealing ring 26 at all arcuate positions.

The inability to inflate the tire 10 is an indication of improper disposition of the locking ring 24 in its locking indentation 36. Such noninflatability provides a signal to inspect the locking ring 24 until the disengaged portions(s) thereof are found and inserted into the locking indentation 36. A tire's refusal to inflate after it has been mounted on the wheel 16 as a result of improper disposition of the locking ring 24 is preferable to permitting initial inflation of the tire 10 regardless of the locking ring's disposition and then sustaining a rapid deflation at a subsequent time. Such postponed deflation is to be avoided since it may occur under unfavorable circumstances which do not lend themselves to the repair and/or reassembly of the wheel structure 16 and tire 10. Due to the engagement between the tire bead 14 and the securing surface 40a as well as the radial extension of the locking ring's restraining portion 42 which engages the restraining flange 22, upsetting moments exerted by the tire bead 14 on the restraining flange 22 are effectively resisted.

It should now be apparent that an improved wheel structure 16 having fewer component parts with improved resistance to tire induced upsetting moments has been provided. The instant wheel structure 16 also includes provisions for preventing inflation of a tire mounted thereon when the locking ring 24 is improperly disposed in the locking indentation 36. Disposition of the air sealing ring 26 in one component of the wheel structure 16 rather than between cooperating components simplifies the procedure for mounting the tire 10 and avoids problems associated with improperly assembling a seal therebetween.

I claim:

1. A wheel structure (16) for a tire (10) comprising:
   an annular rim base (18) disposed about a longitudinal axis (19) and having an inner periphery (28) and an outer periphery (30), said outer periphery (30) including a tire mounting surface (32) and a locking surface (34), said locking surface (34) bounding a locking indentation (36) and being disposed radially nearer said longitudinal axis (19) than said mounting surface (32), said rim base (18) having an annular groove (53) which intersects said locking surface (34);
   an annular restraining flange (22) disposed about said rim base (18);
   a locking ring (24) which is receivable in said locking indentation (36) and is engageable with said locking surface (34) and said restraining flange (22) to prevent axial movement of said restraining flange (22) in a first direction (B);
   means (44,46) for providing fluid communication between the atmosphere and a tire's interior (10a) when a tire (10) is mounted on said tire mounting surface (32);
   means (52) for fluidly connecting said groove (53) and said fluid communication means (44,46); and
   means (26) for obstructing fluid communication through said groove (53) when said locking ring (24) is in engagement with said locking surface (34).

2. The wheel structure (16) of claim 1 said fluid communication obstructing means (26) comprising:
   an annular elastomeric member (26) having a radial thickness (T2) which is housed in said rim base's groove (53) in sealing engagement with said rim base (18).

3. The wheel structure (16) of claim 2 wherein said groove (53) has a radial depth (T1) which is greater than said elastomeric member's radial thickness (T2).

4. The wheel structure (16) of claim 1 wherein said fluid connecting means (52) constitutes an opening (52) which extends in a radial direction relative to said longitudinal axis (19) and has a cross sectional area (A1).

5. The wheel structure (16) of claim 4 wherein said fluid communication means (44,46) includes a conduit structure (46) having a cross sectional area (A2), said fluid connecting means' cross sectional area (A1) being at least as large as said air opening's cross sectional area (A2), said conduit's cross sectional area (A2) being disposed fluidly between said fluid connecting means (52) and the atmosphere.

* * * * *